United States Patent [19]

Sutton

[11] Patent Number: 5,487,109

[45] Date of Patent: Jan. 23, 1996

[54] END OFFICE OF A TELEPHONE SYSTEM WITH A ZERO LOSS PLAN

[75] Inventor: Robert A. Sutton, Montevallo, Ala.

[73] Assignee: BellSouth Corporation, Atlanta, Ga.

[21] Appl. No.: 245,457

[22] Filed: May 17, 1994

[51] Int. Cl.6 .................................................. H04M 11/00
[52] U.S. Cl. ........................... 379/410; 379/402; 379/406; 370/32.1; 370/32
[58] Field of Search .................................. 379/410, 409, 379/408, 406, 402, 229, 228, 246, 93, 94; 370/13, 85.1, 60.1, 32, 32.1

[56] References Cited

U.S. PATENT DOCUMENTS

| | | | |
|---|---|---|---|
| 4,162,378 | 7/1979 | Baudoux et al. | 379/411 |
| 4,558,187 | 12/1985 | Billi et al. | 379/402 |
| 4,864,608 | 9/1989 | Miyamoto et al. | 379/409 |
| 4,896,350 | 1/1990 | Bicknell et al. | 379/224 |
| 5,195,132 | 3/1993 | Bowker et al. | 379/410 |
| 5,283,784 | 2/1994 | Genter | 379/409 |
| 5,315,641 | 5/1994 | Montgomery et al. | 379/93 |
| 5,333,195 | 7/1994 | Bowker et al. | 379/400 |
| 5,337,306 | 8/1994 | Hall | 370/13 |

*Primary Examiner*—Jeffery A. Hofsass
*Assistant Examiner*—Jacques M. Saint-Surin
*Attorney, Agent, or Firm*—Robin, Blecker, Daley & Driscoll

[57] ABSTRACT

An end office of a telephone system in which the end office is operated based on a zero loss plan which requires that the line side equipment be exclusive of any means for introducing loss into the receive paths established in the line side equipment for the subscriber locations served by the end office switch.

17 Claims, 3 Drawing Sheets

END OFFICE OF A TELEPHONE SYSTEM WITH A ZERO LOSS PLAN

BACKGROUND OF THE INVENTION

This invention relates to telephone systems and, in particular, to telephone systems employing end offices having end office electronic digital switches.

In present day telephone systems, a local exchange or regional telephone company operating in a local access transport area (i.e., a so-called "LATA") employs central offices having electronic digital switches. These central offices are adapted to process local calls, i.e., calls which originate and are to terminate within the local calling area of the local exchange or regional telephone company, intra-LATA calls, i.e., calls which originate and are to terminate in the "LATA" of the local exchange or regional telephone company, and inter-LATA calls, i.e., calls which either originate or are to terminate outside the LATA of the local exchange or regional telephone company.

Each central office of a local exchange or regional telephone company is usually classified as either an end office, a local tandem office or an access tandem or LATA tandem office. An end office interfaces with subscriber locations within its wire center area as well as with other central offices. These other central offices can be other end offices, local tandem and/or access or LATA tandem offices within the LATA of the local exchange or regional telephone company or central toll offices of an interexchange carrier or long distance company.

Local tandem offices connect end offices within the same local exchange area. Access tandem offices operated by regional telephone companies connect end offices of different local exchange areas within the same LATA of the regional telephone company. LATA tandem offices provide similar end office connections as acces tandem offices, but have the added ability to provide connections to central toll offices of an interexchange carrier.

An end office interfaces with other central offices via trunks which are connected to the trunk side of the electronic digital switch at the end office. Trunks can be classified in terms of the central offices to which they connect their respective end office. Local tandem trunks connect the end office to a local tandem office. Direct local trunks and direct toll trunks connect their respective end office to another end office and to a central toll office of an interexchange carrier, respectively. Toll tandem trunks, on the other hand, connect an end office to an access or LATA tandem office and, in the case of a LATA tandem office, may be shared by inter and intra-LATA toll calls.

An end office interfaces with subscriber locations via line side equipment which connects to the line side of the end office electronic digital switch. The line side equipment includes a time slot interchanger and a line circuit for each subscriber location. The line side equipment also includes circuitry for reducing the level of echo signals present on the transmit paths included in the line side equipment for each subscriber location.

The echo signals which are unavoidably present in each transmit path are primarily echoes of the far end party's voice signals. These echo signals are carried to the receive path of the line side equipment serving the far end party and are reduced there based upon a so-called fixed loss plan conventionally used by each regional telephone company. The fixed loss plan provides that a predetermined fixed amount of loss be present in a receive path. The particular amount of fixed loss depends upon whether the call is intra-office, intra- exchange (local), intra-LATA (toll) or inter-LATA (toll).

The fixed loss plan requires that a 0 dB loss be present in the receive path for an intra-office call, i.e., a call within the same wire center area served by the end office. For calls continued directly to another end office (i.e., intra-exchange calls), the fixed loss plan requires that a 3 dB loss be present in the receive path. For all other calls, i.e., those continued through local, access or LATA tandem offices or directly through central toll offices of an interexchange carrier, the fixed loss plan provides that a 6 dB loss be introduced into the receive path.

In order to provide the required 3 dB or 6 dB loss in each receive path, the line side equipment at each end office inserts either analog loss in the corresponding line circuit or digital loss in the corresponding digital time slot interchanger, or a combination of both. This loss is inserted into the receive path under the control of the digital switch of the end office.

More particularly, the end office digital switch, determines from the type of trunk circuit seized and from a stored fixed loss plan table correlating trunk types to required fixed loss, whether a 0, 3 dB or 6 dB loss should be inserted into the corresponding receive path. The digital switch software then controls either the line circuit or the time slot interchanger, or both, to provide the required loss in the receive path. This might require removal and/or insertion of loss or maintaining the status quo depending upon the existing loss condition of the path.

As above-indicated, the line side equipment at each end office also includes circuitry for reducing echo signals coupled to each of the transmit paths in the line side equipment. These echo signals are those of the far end party and, as above-noted, are unavoidably returned in some part to the far end party via the near end party's transmit line. The circuitry for this is included in the hybrid circuit of the line circuit and is provided by a variable impedance.

The variable impedance of the hybrid circuit is controlled by the end office digital switch. The switch adjusts this impedance so as to more nearly match the impedance seen by signals forwarded to a subscriber line. This effectively reduces the presence of far end echo signals on the transmit path.

The use of the above-described fixed loss plan and variable impedance hybrid in each end office of a local exchange or regional telephone company has proven successful in realizing acceptable levels for the echo signals. However, the fixed loss plan has certain apparent disadvantages. One disadvantage is the cost and complexity of implementing and maintaining the plan. This is manifested in the need to include loss in each line circuit and/or time slot interchanger in the line side equipment. It is further manifested in the need to adapt the end office digital switch so that it can now control insertion of the required loss in the receive paths.

Another disadvantage is that the presence of the loss in the receive paths reduces the amplitude level of the received signals. As a result, call signals are not received at the optimum amplitude level for hearing. Also, any noise, whether on the receive circuit or in the background of the receiver becomes more bothersome, since the receive signal is lower. Additionally, when digital loss is inserted via the time slot interchanger, analog data signals carried over the same voice path, are impaired by quatification of the digital loss inserted.

It is, therefore, an object of the present invention to provide an end office and method for a telephone system of the above type in which the amplitude level of calls on the receive paths in the line side equipment is improved toward optimization.

It is a further object of the present invention to provide an end office and method which satisfy the above objective in a way which reduces the complexity and amount of equipment or software required to be used in the end office.

SUMMARY OF THE INVENTION

In accordance with the principles of the present invention, the above and other objectives are realized in an end office and method in which the line side equipment of the end office is exclusive of any means which introduces loss into a receive path for reducing echo signals in the path. More particularly, in accordance with the invention, the end office and method are based upon a zero loss plan in which no or 0 dB of loss is present in the receive paths of the line side equipment for all calls regardless of where the calls are continued by the end office i.e., regardless of whether the calls are continued to another subscriber location served by the same end office, or to a local or access or LATA tandem office or to a central toll office of an interexchange carrier.

In further accord with the invention, the end office and method of the invention are additionally adapted such that echo cancellers are used to provide cancellation of echo signals in the transmit paths of the end office. Specifically, echo cancellers are placed in selected trunks of the end office. Particular selected trunks are toll tandem trunks which connect the end office to access or LATA tandem offices in the LATA.

It is also within the contemplation of the invention to incorporate echo cancellers in the transmit paths on the line side of the end office. These echo cancellers, as well as those on the trunk side, can be effected, at least in part, using the functionality of the end office switch.

With the end offices of the telephone system of a local exchange or regional telephone company designed and operated as above-described, i.e., with the zero loss plan and selective placement of echo cancellers, overall transmission is greatly improved by virtue of the reduced loss. Moreover, the performance of the system with respect to echo control is comparable to or better than a conventional telephone system operating on the basis of the above-discussed fixed loss plan. These results are achieved while also reducing the complexity and cost of the system, due to the elimination of the loss in the line side equipment and the lessening of the requirements placed on the end office digital switch which no longer needs to provide control of the loss.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
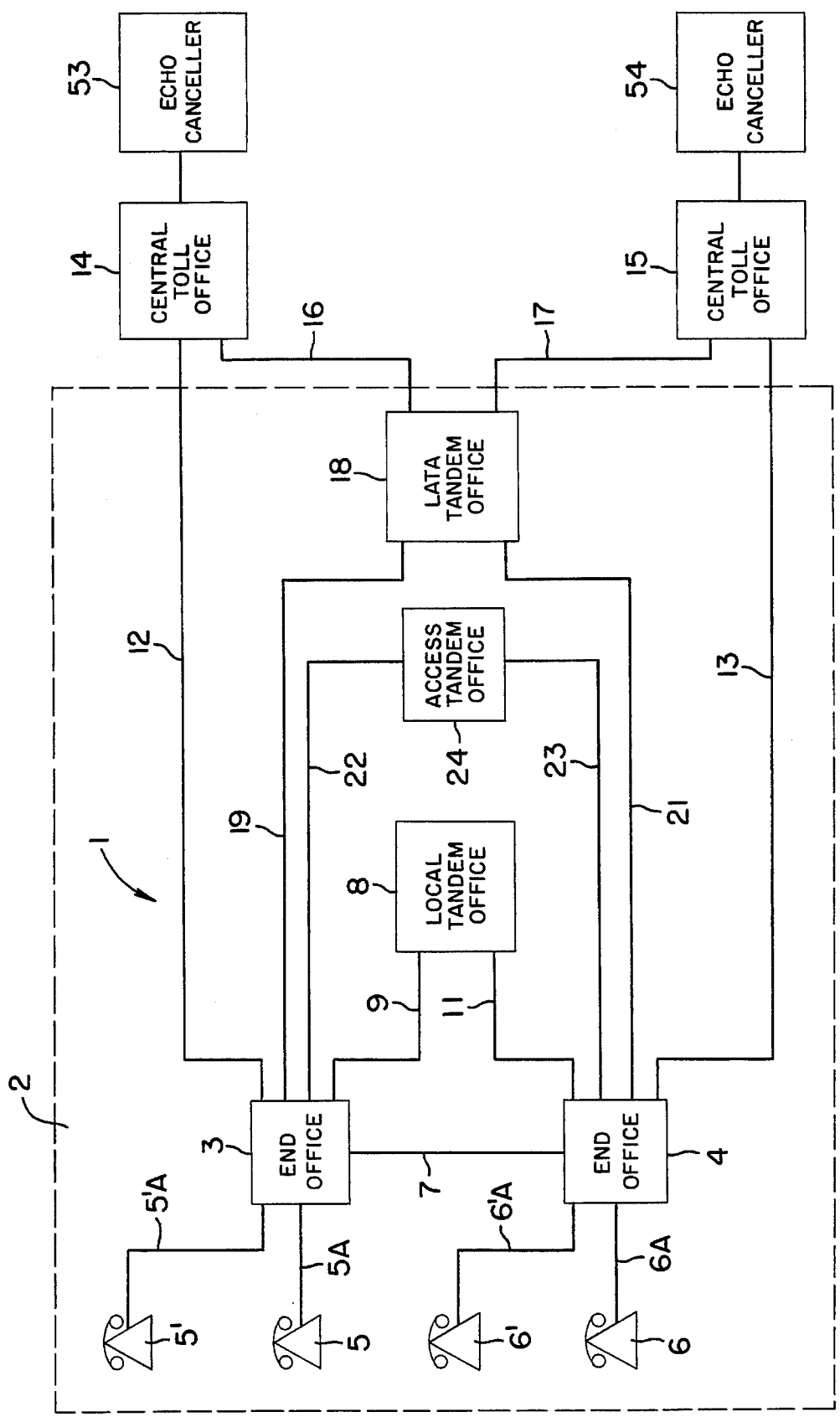
FIG. 1 shows a conventional telephone system of a local exchange or regional telephone company operating based upon the standard fixed loss plan.

FIG. 1 illustrates a standard telephone system 1 of a local exchange or regional telephone company operating within a LATA 2. The telephone system 1 comprises end offices 3 and 4 which connect to and serve respective subscriber locations 5, 5', and 6' 6 via subscriber loops 5A, 5'A, 6A and 6'A. These loops may be two-wire loops as in the case of the loops 5A and 6A or four-wire loops as in the case of the loops 5'A and 6'A.

The end offices 3 and 4 are connected directly to each other by direct local trunks 7. The end offices are also connected to a local tandem office 8 via respective local tandem trunks 9 and 11, respectively.

Direct toll trunks 12 and 13 further connect end offices 3 and 4 to interexchange carrier or long distance telephone company central toll offices 14 and 15, respectively. The latter offices are outside the LATA 2. Toll office trunks 16 and 17 further connect the interexchange carrier central toll offices to a LATA tandem office 18 of the telephone system 1. The LATA tandem office 18 is also connected to the end offices 3 and 4 by toll tandem trunks 19 and 21, respectively. Finally, further toll tandem trunks 22 and 23 connect the end offices 3 and 4 to an access tandem office 24.

In the telephone system 1, local exchange calls of a subscriber location 5 or 6 can be over various paths depending upon the busyness of the various trunks. Thus, these calls can be over the direct trunks 7, the local tandem trunks 9 and 11 and the local tandem office 8. Similarly, intra-LATA toll calls of a subscriber location 5 or 6 can be over the toll tandem trunks 22 and 23 and the access tandem office 24 or the toll tandem trunks 19 and 21 and the LATA tandem office 18. Likewise, inter-LATA toll calls of a subscriber location 5 or 6 can be over the direct toll trunks 12 and 13, respectively, or over the toll tandem trunks 19, 21, the LATA tandem office 18 and the toll office trunks 16 and 17.

Figure 2:
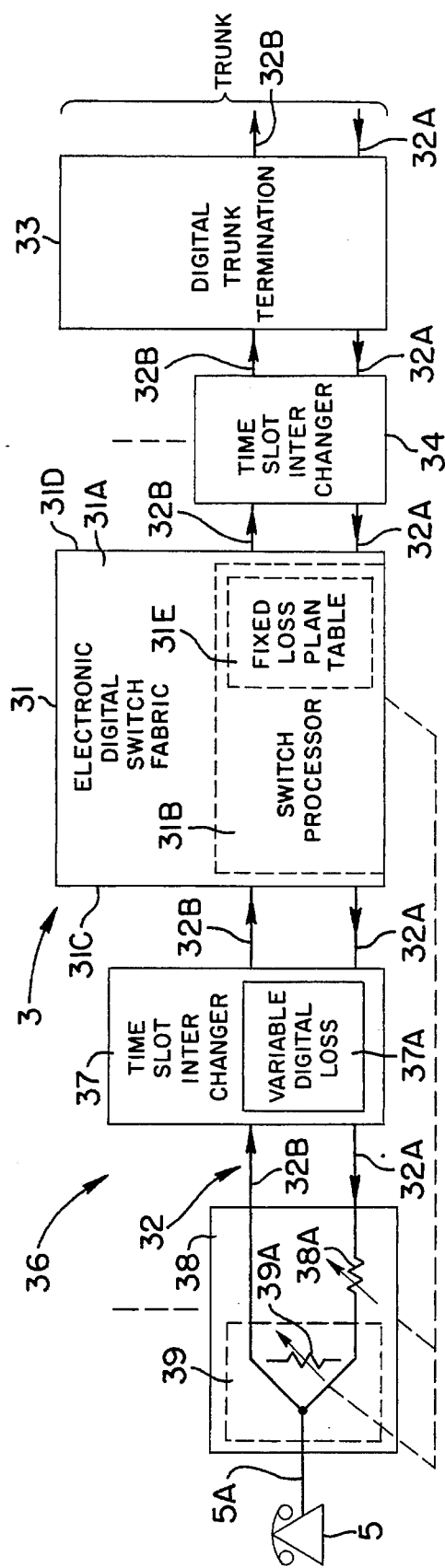
FIG. 2 shows the details of an end office in the telephone system of FIG. 1.

FIG. 2 illustrates the end office 3 of the system 1 in greater detail. The end office 4 is of similar construction as are the other end offices of the system 1. As shown, end office 3 comprises an electronic digital switch 31 having a switch fabric 31A controlled by a program driven processor 31B. The processor 31B controls the switch fabric 31A so that the latter provides a continuation for communication paths established on the trunk and line sides 31C and 31D of the switch.

In FIG. 2, only a communication path 32 established for or associated with the subscriber location 5 and its two wire loop 5A is shown. This path includes a receive path 32A and a transmit path 32B. The receive path 32A carries voice signals incoming to or to be received by the subscriber location, while the transmit path 32B carries voice signals outgoing from or transmitted by the subscriber location.

On the trunk side 31D of the switch 31, the receive path 32A passes through a digital trunk termination 33 and a time slot interchanger 34. The transmit path 32B passes through the same components in the opposite direction. On the line side 31C, the transmit and receives paths 32A and 32B again pass in opposite directions, this time through the line side equipment 36 including a time slot interchanger 37 and a line circuit 38. The line circuit 38 includes a hybrid circuit 39 with a variable impedance 39A. The line circuit 38 couples the transmit and receive paths 32A and 32B with the two wire loop 5A serving the subscriber location 5.

Following conventional practice, the end offices 3 and 4 of the telephone system 1 of FIG. 1 are operated based upon the above-described fixed loss plan to control echo signals in the receive and transmit paths at the end offices. More particularly, the fixed loss plan requires that a preselected fixed amount of loss be in a receive path of an end office as determined by the type of trunk circuit seized by the end office to continue the corresponding transmit path of a line.

If no trunk is seized, i.e., a call is to a subscriber served by the same end office, no or 0 dB loss is required in the receive path. On the other hand, if a direct trunk is seized, a 3 dB loss is required in the receive path. Finally, if any other type of trunk is seized, i.e., a local tandem, a toll tandem or direct toll, a 6 dB loss is required in the receive path.

The fixed loss plan is implemented at each end office 3 or 4 of the system 1 using the digital switch at the end office and either the line circuit or time slot interchanger in the line side equipment or both. This is illustrated in the end office 3 of FIG. 2, by the inclusion of a fixed loss plan table 31E within the switch processor 31B which controls the insertion of digital loss in the time slot interchanger 37 and/or analog loss in the line circuit 38 so that the sum of digital and analog loss is either 3 or 6 dB. In FIG. 2, the variable digital loss is schematically illustrated in the time slot interchanger by a function block 37A, since this loss is generated by bit exchange in the digital signal. The analog loss in the line circuit 38 is, in turn, illustrated by analog loss pads 38A.

When a call is continued from the subscriber location 5, the call is carried to the switch 31 via the two wire loop 5A and the line side equipment 36 on the transmit path 32B. In response to the call, the switch 31, via the switch processor 31B, causes the switch fabric 31A to seize a trunk circuit for continuation of the transmit path of the call. The switch processor 31B also determines from the seized trunk circuit and fixed loss plan table 31E, which table correlates trunk type to required fixed loss, the fixed loss required to be present in the receive path 32A.

The switch processor 31B then controls either the line circuit 38 or the time slot interchanger 37, or both, to cause the appropriate loss to be inserted in the path. If 0 dB loss is required, no loss is inserted in the path. If a 3 dB or 6 dB loss is required, a 3 dB or 6 dB loss, respectively, is inserted in the path.

The above description of the operation of the end office 3 in effecting the fixed loss plan was for the subscriber 5 served by the two wire loop 5A. For a subscriber served by a four wire loop (e.g. the subscriber 5' served by the loop 5'A), the operation of the end office 3 may be slightly modified due to the location and nature of the line circuit and/or the time slot interchanger associated with the four-wire loop.

More particularly, in the case of a four wire loop, the line circuit alone or the line circuit and the time slot interchanger are usually at a field location somewhere between the end office and the subscriber location, which is generally at a very remote location from the end office. In such case, the transmit and receive paths are carried by a digital carrier to the field location.

If both the line circuit and time slot interchanger are at the remote location, their construction and operation are like that described above for the line side equipment in FIG. 2. As a result, the, operation of the end office is similar to that described above. However, if only the line-circuit is at the field location, the line circuit differs from the line circuit 38 in FIG. 2 in that it has a fixed loss, fixed impedance hybrid circuit which is not under switch control. Accordingly, in such situation, the end office effects the fixed loss plan introducing loss in the respective time slot interchanger only.

In accordance with the principles of the present invention, it has been recognized that the end offices 3 and 4 of the system 1 can be simplified so as to operate on a zero loss plan, while still realizing acceptable echo signal levels. More particularly, in accordance with the invention, a zero loss plan is utilized which requires that no or 0 dB loss be in each receive path in the line side equipment at an end office of the system 1 for all connections, regardless of how and where these connections are continued by the end office switch, i.e., regardless of whether continued to a local direct trunk, a toll direct trunk, a local tandem trunk or a toll tandem trunk. This results in a 0 dB end office-to-end office loss for each call through the system 1.

Figure 3:
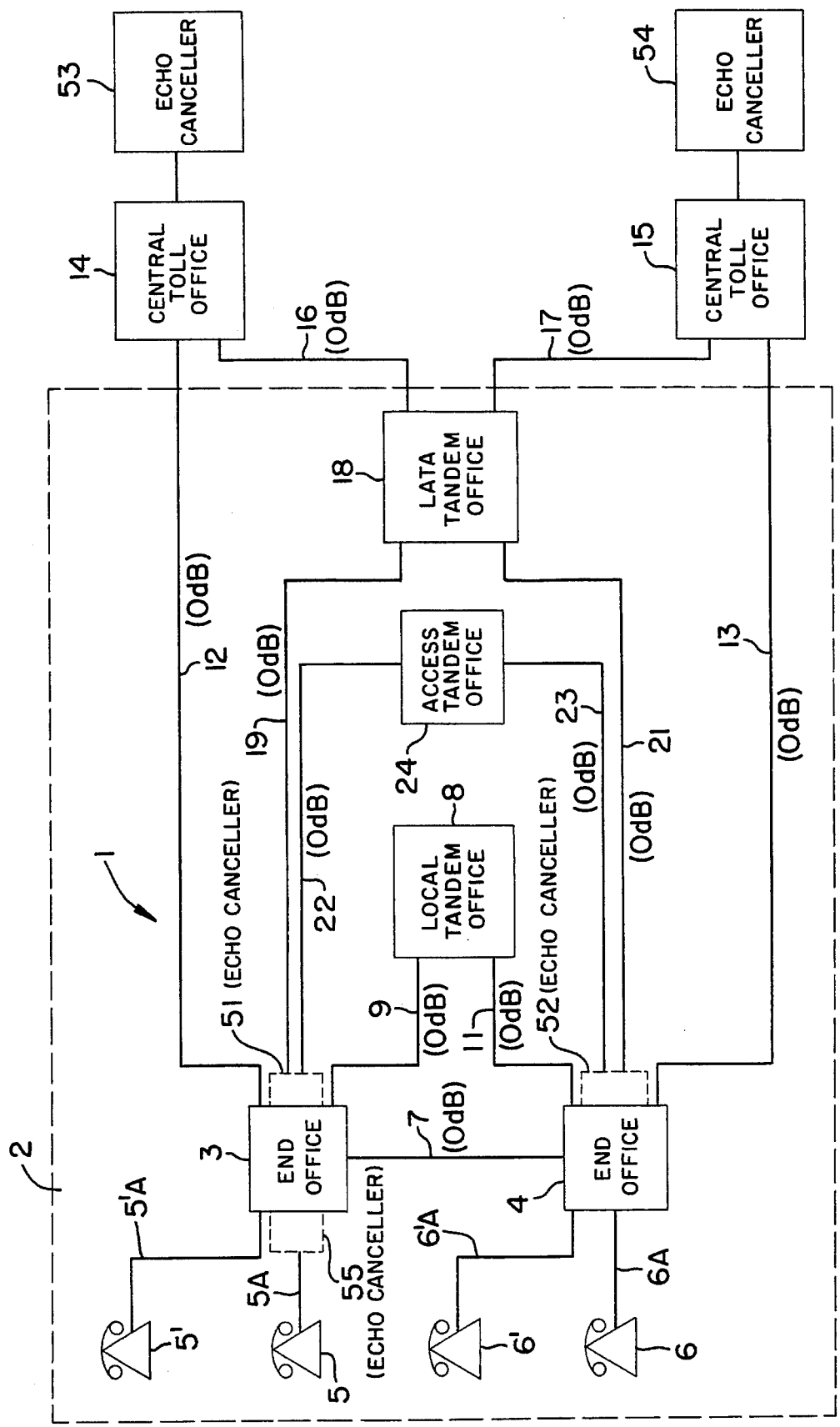
FIG. 3 illustrates a telephone system of a local exchange or regional telephone company operating in accordance with the principles of the present invention based upon a zero loss plan.

FIG. 3 shows the system 1 modified in this manner. More particularly, in FIG. 3, the operation of the system 1 based on the zero loss plan is indicated by the 0 dB designation adjacent the different trunks. This signifies that the receive paths in the line side equipment of the end offices 3 and 4 have no or 0 dB loss in the paths for all calls, as required by the zero loss plan.

Figure 4:
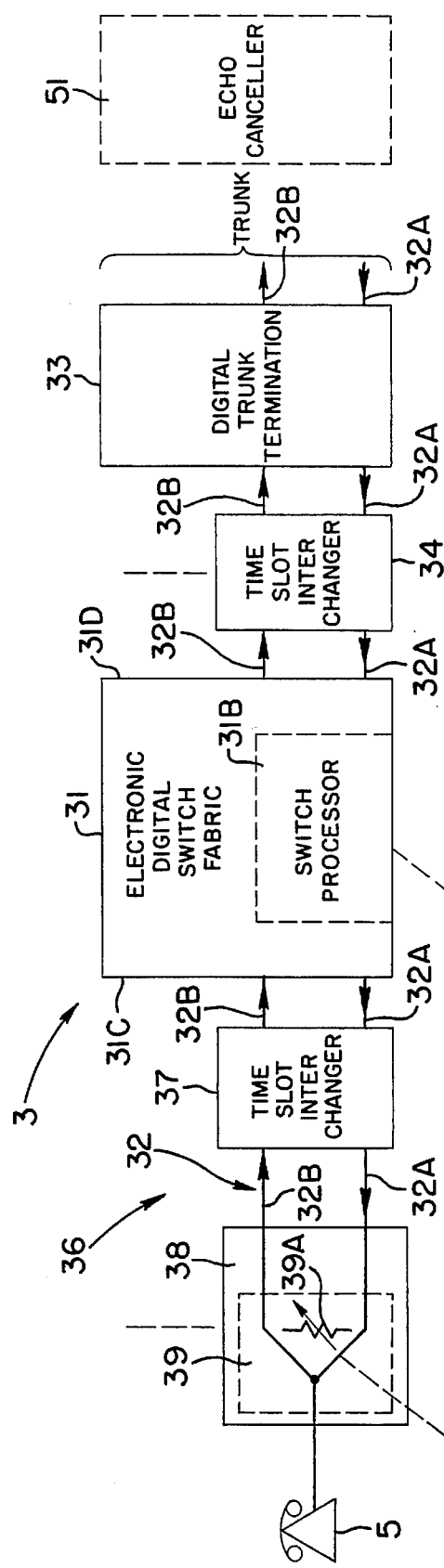
FIG. 4 illustrates an end office in the telephone system of FIG. 3.

FIG. 4 illustrates the end office 3 in greater detail as modified to implement the zero loss plan depicted in FIG. 3 for the subscriber location 5. As can be seen, the analog loss pad 38A of the line circuit 38 and the digital loss functionality 37A of the time slot interchanger 37 have been eliminated, since, no loss is required in the receive path 32A. Similarly, the fixed loss plan table 31E has been eliminated from the switch processor 31B, since the switch processor no longer controls the line circuit 38 or time slot interchanger 37 as to insertion of loss in the receive path.

With the zero loss plan of the invention, the line side equipment and the digital switch of each end office of the system 1 are greatly simplified. This provides an overall significant simplication of the end offices and the entire system. Also, end-to-end transmission is greatly improved.

As above-indicated, operation of the end offices of the system 1 in accordance with the zero loss plan is required to result in echo signals at or below acceptable levels. As a result, where there is a likelihood that additional control of echo signals might be necessary in order to achieve such acceptable levels, the present invention contemplates realizing such control by echo cancellation in the transmit paths of an end office.

More particularly, as the physical distance increases between the near and far end offices handling a call, the electrical distance increases resulting in an increase in the round trip delay of a talker's voice signal. This produces an undesirable "hollow or rain barrel" echo effect and, because of the distances involved, is generally expected to be more pronounced for calls continued through a toll tandem office of the system 1.

Accordingly, in accordance with the invention, echo cancellers 51 and 52 are disposed at the end offices 3 and 4 inserted in the transmit and receive paths of the toll tandem trunks 19, 21, 22 and 23 serving the LATA and access tandem offices 18 and 24. These cancellers compare the signals on each receive path with those transmitted on the corresponding transmit path. If the signals correlate by virtue of the fact that the transmit signal is a reflection of the received signal, samples of the receive signal are then used to model the reflected transmit signal and to cancel or reduce the level of the transmit path reflected signal (echo). In this way, the echo canceller at the end office of a near end party effectively cancels or reduces the echo of the far end party being returned to the far end party via the transmit path of the near end party.

FIG. 3 shows in dotted line placement of the echo cancellers 51 and 52 at the end offices 3 and 4 in the path of the respective toll tandem trunk circuits 19, 21, 22 and 23 of the system 1. FIG. 4 likewise shows in dotted line the echo canceller 51 placed at the end office 3, in the case that the trunk carrying the transmit and receive paths 32A and 32B is the toll tandem trunk 19.

In the description above, it was assumed that the trunks 19 and 21 were shared by both inter-LATA and intra-LATA calls. In order to reduce the functionality of the echo cancellers 51 and 52, the trunks 19 and 21 can each be separated into two trunks, one which carries inter-LATA calls and the other which carries intra-LATA calls. In such case, the echo cancellers 51 and 52 need only interface with the trunks which carry intra-LATA calls to provide appropriate echo reduction or cancellation for the LATA tandem office 18. For inter-LATA calls, this reduction or cancellation would be provided by the echo cancellers 53 and 54 already in place in the central toll offices 14 and 15 of the interexchange carriers.

In some instances, however, an interexchange carrier may not deploy echo cancellers in all of its trunks. In this situation, the trunks carrying the inter-LATA calls to the LATA tandem office 18 would thus pass through the echo cancellers 51 and 52 as well. Additionally, in such case, the direct trunks 12, 13 to the interexchange carrier would also be provided with echo cancellers.

If desired, echo cancellers can be placed at the end offices 3 and 4 in the paths of other trunks as well as the toll tandem trunks. Preferably, an echo canceller is placed in the path of a trunk only when further echo cancellation is actually needed. In this way, the benefits of the zero loss plan, i.e., reduced equipment, complexity and cost, can be maximized.

In the end offices 3 and 4 of the system 1 of FIG. 3, the variable impedance hybrid circuits were retained in the two wire line circuits of the line side equipment. These hybrid circuits were retained because the impedance matching realized by the hybrid circuits under the control of the end office switch is still required to provide a modicum degree of echo control and stability on shorter calls not protected by echo cancellers or receive loss.

It should also be noted that the transmit path echo cancellation provided in the system of FIG. 3 by the trunk side cancellers might also be implemented by placing echo cancellers on the line side of an end office to reduce echo in the transmit paths. This is shown by the echo canceller 55 arranged on the line side of the end office 3. Since these line side echo cancellers would be an integral part of the switch (i.e., would be incorporated in the switch software and implemented via bit exchange in the time slot interchanger), they would only be applied on line-to-trunk connections requiring cancellation.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention. Thus, for example, in the system 1 of FIG. 3, instead of using separate echo cancellers 51, 52 and 55 for the end offices, as shown, these cancellers can be implemented in the system 1 by incorporating all or part of their functionality into the respective end office switches.

What is claimed is:

1. An end office of a telephone system, said end office continuing calls to and from subscriber locations connected to the end office and comprising:

an electronic digital switch having a line side and a trunk side, said trunk side of said electronic digital switch adapted to be connected to a trunk;

and line side equipment connected to the line side of said electronic digital switch, said line side equipment having a transmit path and a receive path associated with a subscriber location and being exclusive of means for introducing analog and digital loss into said receive path for reducing echo signals in said receive path.

2. An end office in accordance with claim 1 further comprising:

an echo canceller on the trunk side of said electronic digital switch for reducing echo signals in said transmit path.

3. An end office in accordance with claim 1 further comprising:

a trunk connected to the trunk side of said electronic digital switch and selectively seized by said electronic digital switch for continuing said transmit path; and said echo canceller is in the path of said trunk.

4. An end office in accordance with claim 3 wherein:

said echo canceller is a separate element from said electronic digital switch.

5. An end office in accordance with claim 3 wherein:

said echo canceller is incorporated at least in part into the functionality of said electronic digital switch.

6. An end office in accordance with claim 3 wherein:

said trunk is a toll tandem trunk.

7. An end office in accordance with claim 1 further comprising:

an echo canceller on the line side of said electronic digital switch for reducing echo signals in said transmit path.

8. An end office in accordance with claim 7 wherein:

said echo canceller is incorporated at least in part in the functionality of said electronic digital switch.

9. An end office in accordance with claim 1 wherein:

said line side equipment includes: a time slot interchanger; and a line circuit; said time slot interchanger and said line circuit being exclusive of introducing digital and analog loss, respectively into said receive path for reducing echo signals in said receive path.

10. An end office in accordance with claim 1 wherein:

said line side equipment has a plurality of pairs of transmit and receive paths, each pair of transmit and receive paths being associated with a different subscriber location, and said line side equipment being exclusive of means for introducing analog and digital loss in each of said receive paths for reducing echo signals in that receive path.

11. A method of operating an end office in a telephone system, the end office serving subscriber locations connected to the end office, the method comprising:

establishing a transmit path associated with a subscriber location to the line side of an electronic digital switch; and establishing a receive path associated with the subscriber location from the line side of said electronic digital switch without providing analog and digital loss for reducing echo signals in said receive path.

12. A method in accordance with claim 11 further comprising:

cancelling echo signals in said transmit path on the trunk side of said electronic digital switch.

13. A method in accordance with claim 12 further comprising:

continuing said transmit path on said trunk side of said electronic digital switch on a toll tandem trunk.

14. A method in accordance with claim 12 wherein:

said cancelling occurs out side the functionality of said electronic digital switch.

15. A method in accordance with claim 12 wherein:

said cancelling occurs at least in part within the functionality said electronic digital switch.

16. A method in accordance with claim 11 further comprising;

cancelling echo signals in said transmit path on the line side of said electronic digital switch.

17. A method in accordance with claim 16 wherein:

said cancelling occurs at least in part within of the functionality of said electronic digital switch.

* * * * *